(12) United States Patent
Phares et al.

(10) Patent No.: US 9,533,429 B2
(45) Date of Patent: Jan. 3, 2017

(54) SYSTEM AND PROCESS FOR MIXING CONCRETE HAVING DESIRED STRENGTH CHARACTERISTICS

(71) Applicant: Command Alkon Incorporated, Birmingham, AL (US)

(72) Inventors: Robert W. Phares, Birmingham, AL (US); Charlene Hohl, Pelham, AL (US)

(73) Assignee: Command Alkon, Inc., Birmingham, AL (US)

( * ) Notice: Subject to any disclaimer, the term of this patent is extended or adjusted under 35 U.S.C. 154(b) by 651 days.

(21) Appl. No.: 13/834,544

(22) Filed: Mar. 15, 2013

(65) Prior Publication Data

US 2014/0241104 A1    Aug. 28, 2014

Related U.S. Application Data

(60) Provisional application No. 61/770,189, filed on Feb. 27, 2013.

(51) Int. Cl.
| | |
|---|---|
| B28C 5/00 | (2006.01) |
| B28C 7/02 | (2006.01) |
| B28C 7/04 | (2006.01) |
| B28C 9/04 | (2006.01) |
| C04B 40/00 | (2006.01) |

(52) U.S. Cl.
CPC ............... *B28C 7/02* (2013.01); *B28C 7/0422* (2013.01); *B28C 9/0409* (2013.01); *C04B 40/0032* (2013.01)

(58) Field of Classification Search
CPC .................................................. B28C 5/003
USPC ............................................... 366/8, 16, 18
See application file for complete search history.

(56) References Cited

U.S. PATENT DOCUMENTS

| | | | | |
|---|---|---|---|---|
| 5,527,387 A | * | 6/1996 | Andersen | ................ B28B 1/52 106/693 |
| 5,713,663 A | | 2/1998 | Zandberg et al. | |
| 5,752,768 A | | 5/1998 | Assh | |
| 7,386,368 B2 | | 6/2008 | Andersen et al. | |
| 8,118,473 B2 | | 2/2012 | Compton et al. | |
| 2005/0103119 A1 | * | 5/2005 | Shtakelberg | ......... G01N 33/383 73/803 |
| 2005/0279178 A1 | * | 12/2005 | Shtakelberg | ......... G01N 33/383 73/803 |
| 2011/0004332 A1 | * | 1/2011 | Andersen | ............ C04B 40/0032 700/103 |
| 2011/0004333 A1 | * | 1/2011 | Andersen | ............ C04B 40/0032 700/103 |

FOREIGN PATENT DOCUMENTS

| | | |
|---|---|---|
| CN | 202720502 U | 2/2013 |
| DE | 2935997 A1 | 8/1980 |
| DE | 19952978 A1 | 5/2001 |
| EP | 2026225 A2 | 2/2009 |
| GB | 2321205 A | 7/1996 |
| JP | 08183021 | 7/1996 |

OTHER PUBLICATIONS

UK Intellectual Property Office, Search Report and Examination Opinion, GB 1403176.9 (dated Aug. 26, 2014).
GB Application No. GB1403176.9, "Patents Act 1977: Examination Report under section 18(3)," May 1, 2015.
GB Application No. GB1403176.9, Response to Examination Report of May 1, 2015, Aug. 28, 2015.
GB Application No. GB1403176.9, "Patents Act 1977: Request for further search fee," Dec. 18, 2015.
GB Application No. GB1403176.9, Response to Request of Dec. 18, 2015, Feb. 11, 2016.
GB Application No. GB1403176.9, "Patents Act 1977: Examination Report under section 18(3)," Mar. 8, 2016.
GB Application No. GB1403176.9, Response to Examination Report of Mar. 8, 2016, May 4, 2016.
UKIPO Application No. GB1403176.9, Examination Report Under Section 18(3), May 17, 2016.

\* cited by examiner

*Primary Examiner* — David Sorkin
(74) *Attorney, Agent, or Firm* — Jacob W Neu; Bradley Arant Boult Cummings, LLP

(57) ABSTRACT

A method and system for system for rapidly determining the predicted strength of concrete prior to pouring the concrete is disclosed herein. The system and process provides for a database storing concrete family characteristics that may be updated as actual strength of poured concrete is determined. The process also allows construction workers to pour concrete with a keener knowledge of the resulting concrete strength.

6 Claims, 2 Drawing Sheets

SYSTEM AND PROCESS FOR MIXING CONCRETE HAVING DESIRED STRENGTH CHARACTERISTICS

FIELD OF THE INVENTION

The invention relates generally to concrete production.

BACKGROUND ART

Concrete is produced by mixing cementitious material, water, aggregates (such as gravel, crushed limestone, or sand) into a plastic mixture, which undergoes a chemical process (known as hydraulic curing) to harden and strengthen. Other materials, such as admixtures, pozzolans, plasticizers, reinforcers or other compounds, may be added to the mix, depending on the concrete formula selected. Concrete formulas are grouped into concrete families, which are characterized by similarities in composition and function, and for which a reliable relationship between relevant properties can be determined. For example, a concrete family may be defined by concrete formulas sharing type or source characteristics (e.g., Portland pozzolan cement, masonry cement, blends, etc.); demonstrably similar aggregates or admixtures; the use and type of plasticizers or other water-reducing compounds; consistence (or slump) classes; entrained air content; mixing and curing methods; or combinations of these various qualities or categories. Particular concrete families are desired for various applications, based upon the performance and cost constraints of the end use.

Each concrete family is characterized by a relationship between various relevant material design properties. For concrete, such properties include among others the water-cement ratio (W/C ratio), which is the ratio of water mass to cement mass (including pozzolanic materials, if used) in the mixture, the compressive strength, the tensile strength, elasticity, and thermal expansion coefficient. For example, in a particular concrete family, the W/C ratio is inversely related to the compressive strength. However, the particular nature of that inverse relationship is influenced by other characteristics inherent to the concrete family.

Although the general relationship between W/C ratio and compressive strength in concrete is known, builders and concrete producers have been unable to quickly and accurately determine the water and concrete amounts for a particular delivery of concrete. In current practice, the concrete production process consists of a series of automated and manual steps that may result in an inaccurate record of exactly how much water and cement actually went into the delivery. Also, trucks delivering concrete to a construction site may add varying amounts of water to the mixture it is transporting. Because this will alter the W/C ratio of each individual mixture transported to the site, the resulting concrete pour may exhibit inadequate strength properties unless corrected. Current practice is to use more cementitious material in the concrete formula mixed at the plant to compensate for water that may be added during transport. However, because cementitious material is generally the most expensive component of concrete, this has the effect of increasing cost. Furthermore, if substantial quantities of water must be added to the delivered concrete during transport or pouring, the resulting concrete may still exhibit inadequate strength. Concrete exhibiting inadequate compressive strength must be removed and reworked, resulting in substantial time delays and cost overruns. Because concrete is not considered fully cured and of maximum strength until twenty-eight days after pouring, the resulting delay may be very substantial, and replacement of the defective concrete can be very expensive and require reworking of other parts of the construction.

What is needed, then, is a concrete production method and system for quickly and accurately determining water and concrete inputs in order to determine an expected compressive strength for the cured concrete.

SUMMARY OF THE INVENTION

In some respects, the disclosure relates to a process for mixing a concrete batch to meet or exceed a predetermined compressive strength, having steps of recording an amount of water added to the batch; recording an amount of cement added to the batch; transmitting the amount of water added and amount of cement added to a processor; prior to pouring the concrete, calculating from the added water weight and added cement weight a batch water-to-cement ratio with the aid of the processor; prior to pouring the concrete, comparing the batch water-to-cement ratio to a desired water-to-cement ratio associated with concrete exhibiting the predetermined compressive strength according to a database of concrete family characteristics maintained on a computer; and prior to pouring the concrete, providing a notification of the predicted concrete strength.

In other aspects, the disclosure relates to a method for preparing a batch of concrete to meet or exceed a predetermined compressive strength and made of water, cement, and aggregate mixed according to a predefined concrete family, having the steps of mixing a batch of concrete characterized by an initial water-to-cement ratio; periodically measuring an amount of water added to the batch; transmitting the measurement of the amount of water added to a processor; prior to pouring the concrete, calculating a revised water-to-cement ratio for the batch with the aid of the processor; prior to pouring the concrete and for each calculation of the revised water-to-cement ratio, comparing the revised water-to-cement ratio to a desired water-to-cement ratio associated with the predetermined compressive strength for the concrete family according to a database of concrete family characteristics maintained on a computer; prior to pouring the concrete, correlating the revised water-to-cement ratio to a predicted concrete strength of the batch; and prior to pouring the concrete, providing a notification of the predicted concrete strength.

In other aspects, the disclosure relates to a system for mixing a concrete batch to have a predetermined compressive strength, the system having a processor comprising a transceiver to receive or transmit signals, a database comprising laboratory information and field information, and an algorithm for calculating a W/C ratio and comparing the calculated ratio against information in the database; a concrete truck comprising a truck water input system, and a transceiver to receive or transmit signals to the processor; and a concrete manufacturing plant comprising a plant water input system, a plant cement input system, and a transceiver to receive or transmit signals to the processor.

DETAILED DESCRIPTION

Figure 1:
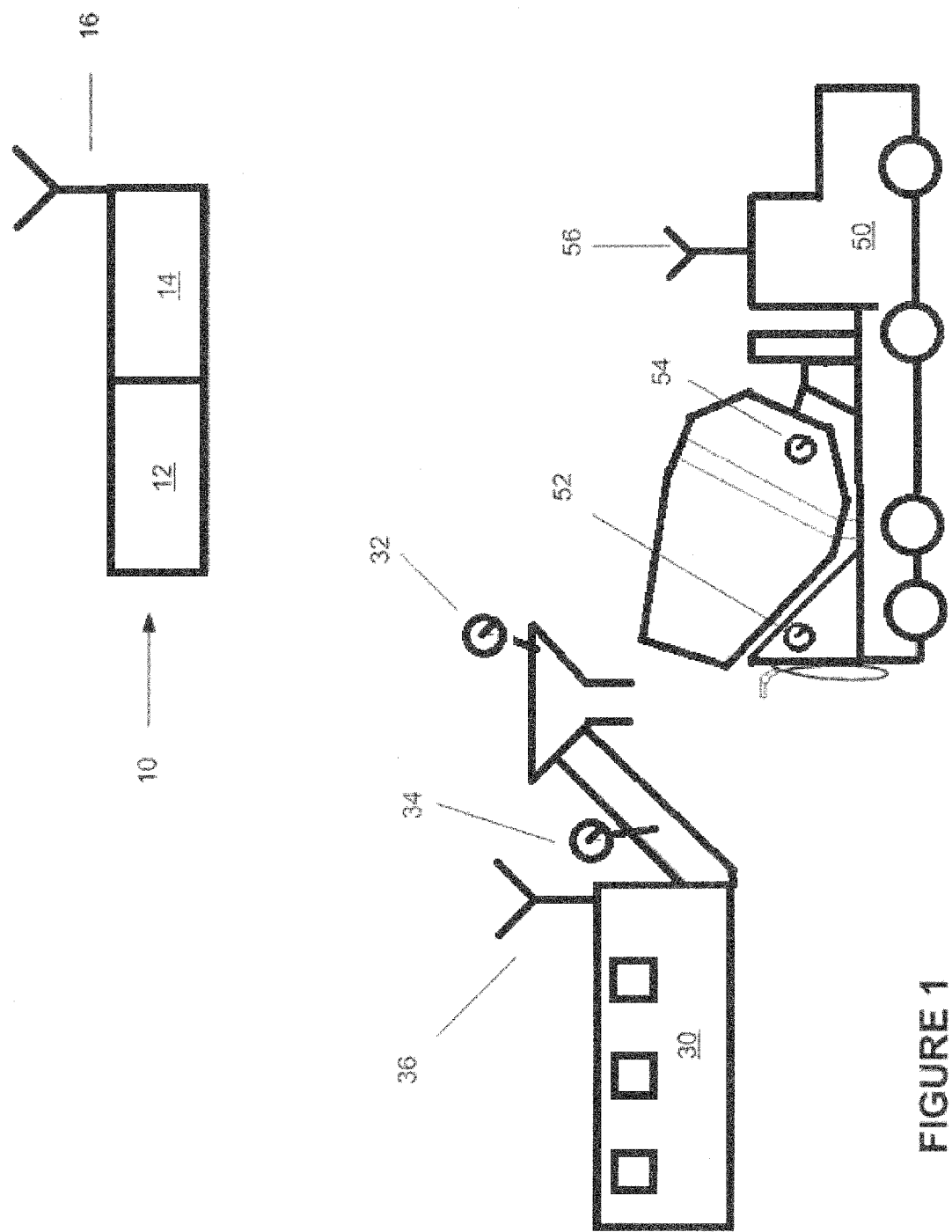
FIG. 1 depicts an embodiment of a system according to the disclosure.

FIG. 1 depicts an embodiment of a system according to the disclosure. A server 10 (or a group of servers) maintains a database 14 of characteristics and properties for various families of concrete. The term "database" as used herein refers to an organized data structure comprising a plurality of records stored in machine-readable format. These properties may be tabulated from laboratory experiments, field testing of known concrete mixtures, and construction and engineering theory. The database 14 may include some combination of information concerning the batch materials, amounts, and ratios for a particular family; properties for particular formulas, such as slump, strength, elasticity, and thermal expansion coefficients; and graphs, curves, mathematical models, or other information or mathematical relations relating the properties of particular formulas in the family to other properties, material amounts, or material ratios.

In some embodiments and as depicted in FIG. 1, the server 10 also includes a specific processor 12 programmed to calculate the W/C ratio for a particular concrete mixture and comparing the W/C ratio to characteristics set forth in the database 14. The term "processor" or "central processing unit" (CPU) as used herein refers to a software execution device capable of executing a sequence of instructions ("program"). The CPU comprises an arithmetic logic unit, and may further comprise one or both of a register and cache memory. In other embodiments the processor 12 may be located on a different server 10, or may be located at a plant 30 or on a truck 50. The particular location of the processor 12 is not critical so long as it can receive or transmit information from or to the database 14 and other components providing information regarding the water or cementitious material content of a concrete mixture. To receive and transmit information, the server 10 of FIG. 1 has a modem, transceiver, wireless router, or other communications device 16 commonly used for communication between various locations to maintain electronic communication with the other components of the system.

For many concrete delivery methods, the constituent materials for the concrete are pre-mixed at a concrete plant 30 and then carried by truck 50 to a pouring location at a construction site. The plant 30 mixes concrete according to the formula determined to be most suitable for the construction site and to achieve the predetermined compressive strength. The particular formula will belong to a concrete family and have a particular combination of the various constituent materials, including water, cementitious material, aggregates, and (depending on the concrete family or formula selected) other admixtures, pozzolans, plasticizers, reinforcers or other compounds. In order to control production of the mixture, the plant 30 measures the mass or weight of both water and cementitious material mixed into the concrete mixture. The water-measuring device 32 and cement-measuring device 34 may be any device useful for measuring an amount (such as the mass, weight, or volume) of water or cement, respectively, such as a scale, load cell, pressure or mass sensor, or mass flow meter. The water measuring device 32 and cement-measuring device 34 are connected to a communications device 36 which transmits the mass of water and cementitious material added to the concrete mixture to the processor 12. Other measuring devices may measure the temperature, content, and amount of other constituent materials added to the mixture, and these measurements may be transmitted via the communications device 36 to the processor 12 as well.

Once the concrete is mixed at the plant 30, a concrete truck 50 receives the concrete mixture. More cement or water may be added while at the plant 30, during the post-production period. After post-production, the truck 50 transports the concrete to the construction site for pouring. During transportation and pouring, water may be added for various reasons. For example, water may be added to improve the consistence or slump of the concrete, or may simply be present in the delivery truck 50 mixing barrel after being washed out from the previous delivery. However, adding water also increases the W/C ratio and decreases the compressive strength of the concrete.

Because adding water or cementitious material to the concrete mixture during production, transport, or pouring alters the W/C ratio of the concrete, these changes will affect the compressive strength of the concrete poured by the delivery truck 50. In the system disclosed herein, the truck 50 has a water-measuring device 52 such as a sensor, load cell, scale, or meter, to measure the amount of water (such as the mass, weight or volume) added to the concrete mixture.

Current concrete delivery protocol generally does not provide for the addition of cementitious material to the mix after the truck 50 leaves the plant 30, due to the potential for concrete to harden too quickly and the typical driver's lack of expertise in concrete formula design. However, it is possible for the truck 50 to be further equipped with a cement-measuring device 54 to measure the amount of cement added to the mixture, in the event that cement is added. This could provide further flexibility in responding to changes in the concrete during transportation and pouring in connection with the disclosure herein.

The water measuring device 52 (and cement-measuring device 54, if equipped on the truck 50) connects to a communication device 56, such as a transceiver, wireless router, modem, or other device, to communicate the added water and cement amounts to the processor 12. Alternatively, the truck driver may manually input into the communications device 56 known amounts of water that were added but not measured by the truck's 50 onboard water-measuring device 52.

The system provided above allows the concrete engineer or designer to rapidly and accurately determine the W/C ratio and predicted strength for a batch of concrete prior to or during pouring and therefore allows the concrete engineer to determine the suitability of the batch of concrete in real time. Previously, concrete engineers have been unable to make this determination accurately and quickly and have generally relied on guesswork and over-strengthening the concrete by adding additional cementitious material during the initial mix and batching process. This results in substantially higher costs, because cementitious material is the most expensive component of concrete. However, applicant's system and the following process provide concrete engineers the ability to accurately determine strength prior to pouring the concrete at the construction site.

Figure 2:
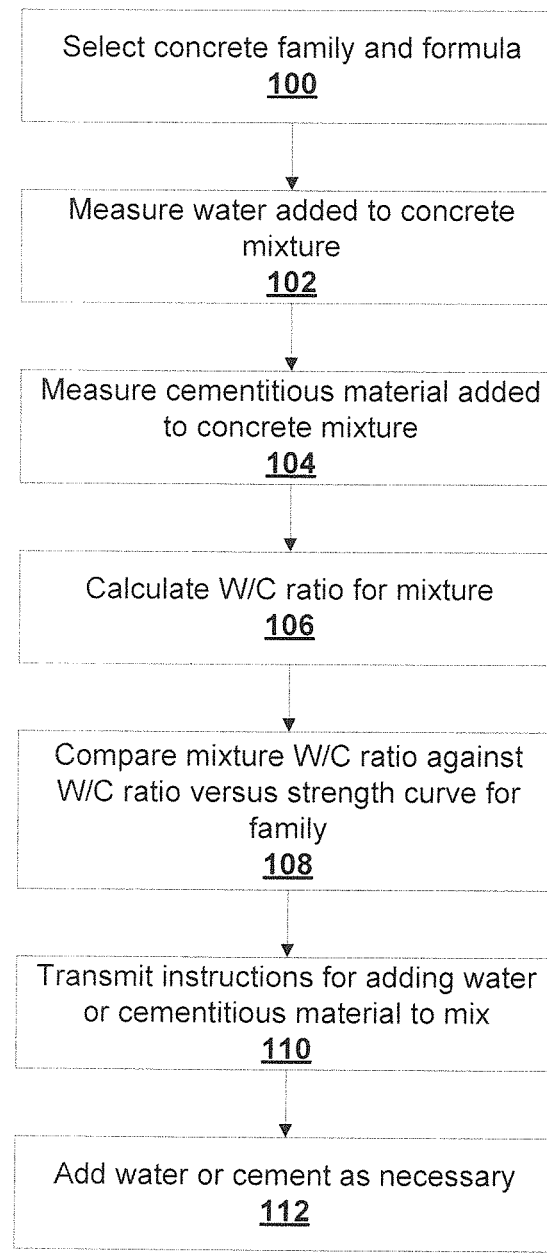
FIG. 2 depicts an embodiment a process according to the disclosure.

An example process depicted in FIG. 2 for utilizing the system and depicted allows for mixing the concrete to pour at the delivery site and cure with the desired compressive strength while minimizing or eliminating the concern of inadequate concrete strength.

In step 100, a preliminary determination is made as to the concrete family and formula and the quantity of concrete to be used in conjunction with a particular construction site. This is done in accordance with standard principles of concrete design and construction. After the family and formula are selected, the components and mix instructions for the concrete are sent to the plant 30 for the production phase. Cement, aggregate, and water are added to the mix during the production and post-production phases, along with any other admixtures, pozzolan, plasticizers, or other materials used in formulating the batch. As noted above, the truck 50 or driver may add more water to the concrete mix during the transportation and pouring phases.

In step 102, the water-measuring devices 32 and 52 measure the amount of water added to the concrete during the production, post-production, transport, and pouring stages. The water-measuring devices 32 and 52 may record the amount added and transmit the measurements through the communication devices 36 and 56 to the processor 12. The water measuring devices 32 and 52 may transmit the quantity of water added continuously, at periodic intervals (e.g., every ten minutes), or upon prompting or request by the user. Transmission upon user request or prompt may be useful, for example, when a user desires to know the current W/C ratio and whether further water or cement needs to be added.

In step 104, the cement-measuring devices 34 and 54 measure the amount of cementitious material added during the production and post-production processes (and, if permitted, during transport and pouring). The cement-measuring devices 34 and 54 may record the amount added and transmit the measures through the communication devices 36 and 56 to the processor 12. Similar to transmission of the water measurements, such transmissions may be made continuously, at periodic intervals, or upon user request or prompt.

Measurements of additional constituent materials or properties, such as mass of the aggregates, temperature of the concrete, and slump, may also be made by sensors (not shown) at the plant 30 or truck 50 and transmitted via communication devices 36 and 56 to the processor 12. These properties determine the formula and composition of the concrete that is actually mixed at a particular plant 30 and delivered by the truck 50 and may be correlated with a particular concrete family or formula to further determine characteristics of the concrete. While taking such measurements is not necessary to perform the process described herein, such measurements can result in a more accurate determination of the quality of the concrete delivered.

As the processor 12 receives the measurements, the processor 12 is programmed to calculate the W/C ratio in step 106 by dividing the total amount of water added to the concrete mix by the total amount of cementitious material added to the mix.

In step 108, the processor 12 is programmed to compare the W/C ratio calculated in step 106 against the concrete family (or against the formula) preselected in step 100. The qualities of the concrete family and formula are maintained in the database 14. As noted above, the database 14 may include entries for concrete formulas and corresponding qualities based on lab tests, field testing, or construction engineering theory. If measurements of slump, temperature or other qualities are made, these may also be compared against information contained in the database 14 to further refine the nature of the concrete and provide for more accurate comparisons.

By comparing the W/C ratio of the concrete mix to the established relationship between W/C ratio and compressive strength tabulated for the concrete family or formula in the database 14, the processor 12 predicts whether the concrete mix will cure with sufficient compressive strength to meet or exceed the compressive strength that is predetermined or supplied by the construction design requirements.

In step 110 the processor 12 transmits the result of the comparison to the truck 50. The result may also be transmitted to appropriate quality control and management personnel via electronic mail or other form of electronic communication. In some embodiments, this result may indicate whether the predicted strength for the concrete mix in the truck 50 is higher or lower than the required strength determined in step 100. Also in some embodiments, the result may indicate whether the W/C ratio for the concrete mix in the truck 50 is higher or lower than the desired W/C ratio preselected in step 100.

It is critical to this invention that the determination of the W/C ratio and the predicted compressive strength of the concrete and its transmission to the driver, concrete engineer, construction foreman, or other person responsible for pouring the concrete be done prior to pouring the concrete. Because concrete will continue to harden during transport, preparation for pouring, and pouring, the steps above are time-sensitive. If the predicted concrete strength cannot be determined in a timely manner, either the concrete will harden and become unusable or pouring must proceed without the benefits and advantages obtained by practicing the procedures disclosed herein.

In step 112, if the W/C ratio is lower than the necessary W/C ratio according to the database 14, then the driver may either leave the mix as it is or, if necessary, add water to correct other properties of the concrete mix, such as slump. If the predicted strength is less than the required strength, the load may be returned to the plant 30 for recycling, or the delivery may be diverted to a different project with less demanding strength requirements. (If the driver is permitted to added cement to the mix, the driver may perform that task as well.) The process may be repeated as often as necessary during mixing, transport, and pouring to maintain the appropriate W/C ratio and compressive strength.

After delivery, the total amounts of water and cement added to the concrete mix are provided to the database 14. After twenty-eight days, the strength of the concrete is determined through standard concrete strength tests. The actual strength for the concrete delivered to the construction site is entered into the database 14. In this way, the data relating to various concrete families may be updated to provide for more accurate comparisons during future concrete deliveries.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A process for mixing a concrete batch to meet or exceed a predetermined compressive strength, the process comprising:
   a. recording an amount of water and an amount of cement added to the batch during mixing at a concrete plant;
   b. transmitting the amount of water added and amount of cement added to a processor;
   c. transferring the concrete batch to a concrete truck;
   d. adding an amount of water or an amount of cement to the concrete batch while the concrete batch is in the truck;
   e. transmitting to the processor the amount of water and amount of cement added while the concrete batch is in the truck;
   f. prior to pouring the concrete, calculating from the added water weight and added cement weight a batch water-to-cement ratio with the aid of the processor;
   g. prior to pouring the concrete, correlating the batch water-to-cement ratio to a predicted concrete strength, according to a database of concrete family characteristics including calculated water-to-cement ratios and actual concrete strengths; and h. prior to pouring the concrete, providing a notification of the predicted concrete strength.

2. The process of claim 1, further comprising after providing a notification and prior to pouring the concrete, the step of adding a quantity of water to the concrete batch to result in a revised water-to-cement ratio, correlating the revised water-to-cement ratio to a revised predicted concrete strength, and providing notification of the revised predicted concrete strength.

3. The process of claim 1, further comprising after the step of providing a notification and prior to pouring the concrete, the step of adding cement to the concrete batch to result in a revised water-to-cement ratio, correlating the revised water-to-cement ratio to a revised predicted concrete strength, and providing notification of the revised predicted concrete strength.

4. The process of claim 1, where the recording of either the amount of water added or the amount of cement added is performed constantly.

5. The process of claim 1, where the recording of either the amount of water added or the amount of cement added is performed periodically.

6. The process of claim 1, where the recording of either the amount of water added or amount of cement added is entered by a user.

* * * * *

UNITED STATES PATENT AND TRADEMARK OFFICE
CERTIFICATE OF CORRECTION

PATENT NO. : 9,533,429 B2
APPLICATION NO. : 13/834544
DATED : January 3, 2017
INVENTOR(S) : Phare et al.

Page 1 of 1

It is certified that error appears in the above-identified patent and that said Letters Patent is hereby corrected as shown below:

On the Title Page

Item (12), Line 2, Replace "Phares et al." with --Phare et al.--

Item (72), Line 1, Replace "Robert W. Phares, Birmingham, AL" with --Robert W. Phare, Birmingham, AL--

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*